(12) United States Patent
Jazra

(10) Patent No.: US 8,441,965 B2
(45) Date of Patent: May 14, 2013

(54) METHODS AND APPARATUS FOR REDUCING DATA TRANSMISSION OVERHEAD

(75) Inventor: Cherif Jazra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 234 days.

(21) Appl. No.: 12/850,884

(22) Filed: Aug. 5, 2010

(65) Prior Publication Data

US 2012/0033612 A1    Feb. 9, 2012

(51) Int. Cl.
*H04B 7/005* (2006.01)
*H04Q 7/00* (2006.01)

(52) U.S. Cl.
USPC .......................................... 370/278; 370/328

(58) Field of Classification Search .................. 370/252, 370/254, 255, 278, 282, 328, 338, 401
See application file for complete search history.

(56) References Cited

U.S. PATENT DOCUMENTS

| 5,444,702 A * | 8/1995 | Burnett et al. ............... 370/254 |
| 8,081,569 B2 * | 12/2011 | Kourkouzelis et al. ....... 370/230 |
| 2002/0055364 A1 | 5/2002 | Wang et al. |
| 2006/0034213 A1 * | 2/2006 | Munje et al. .................. 370/328 |
| 2006/0155721 A1 * | 7/2006 | Grunwald et al. ............ 707/100 |
| 2011/0051695 A1 * | 3/2011 | Dinan ........................... 370/336 |

OTHER PUBLICATIONS

ETSI TR 136 91.2 V9.3.0 (Jun. 2010) Technical Report—LTE; Feasibility Study for Further Advancements for E-UTRA (LTE-Advanced) (3GPP TR 36.912 Version 9.3.0 Release 9)—64 pages.

* cited by examiner

*Primary Examiner* — Hong Cho
(74) *Attorney, Agent, or Firm* — Gazdzinski & Associates, PC

(57) ABSTRACT

Methods and apparatus for reducing data transmission. In one embodiment, rather than immediately transmitting first data, a first device postpones opening a data connection; any subsequently arriving data is queued with the first data, and transmitted together. Connection overhead is optimized by delaying connection establishment until it is necessary, and in some cases eliminating idle mode operation altogether. Stochastic embodiments are also disclosed for adjusting transmission behavior to maximize one or more desirable outcomes. For example, one such embodiment queues data for a stochastically determined period of time, prior to opening a data connection. The stochastically determined time interval balances the likelihood of efficiently servicing successively arriving data, and overall performance. Mechanisms for receiving and utilizing device user and/or receiver (e.g., base station) feedback are also disclosed.

24 Claims, 8 Drawing Sheets

METHODS AND APPARATUS FOR REDUCING DATA TRANSMISSION OVERHEAD

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of telecommunications. More particularly, in one exemplary aspect, the present invention is directed to methods and apparatus for reducing data transmission overhead by delaying transmission of data.

2. Description of Related Technology

Most wireless communication systems establish a logical "connection" between the source device and destination device (or network) before transmitting data. Such connectivity enables desirable connection qualities and capabilities, such as inter alia, physical resource management, multiplexed access, Quality of Service (QoS) guarantees, link management, data security, etc. However, connection establishment is a non-trivial process that often involves multiple entities, transactions, and negotiation sequences, and which can require an appreciable amount of time to complete. For example, connection establishment for cellular phone type mobile devices can span from hundreds of milliseconds to several seconds. In many cases, such connection latency is perceptible to the user, and if protracted can lead to significant user frustration.

So-called "idle" states (and other analogous "dormant" state variations) are used throughout the related arts to minimize the network overhead associated with repeatedly bringing up, and tearing down connections. Excessive amounts of connection transitions e.g., bringing up and tearing down connections (also referred to as "churn") is highly undesirable.

For example, FIG. 1 illustrates one genericized state diagram for prior art connection management between two wireless peers. In the disconnected state 102, a first device does not have a connection to any peer devices. In some systems, the first device can put its modem in a low power, or even an unpowered state. Responsive to a connection request (e.g., initiated by a user, etc.), the first device transitions to a connected state 104; during the connected state, the first device can transmit data to a second device. Once the first device has finished transmitting its data, the first device transitions to an idle state 106 and waits for newly arriving data. During the idle state, the first device sustains some minimal level of communication to keep a connection open e.g., physical resources, etc. (as opposed to the disconnected state 102, which does not sustain any level of communication.) By keeping the wireless signalling channels open, the modem can instantly serve subsequent data communications by returning to the connected state 104; reusing the existing connection reduces connection churn. However, if no subsequent data is available for transfer within the fixed time interval, the first device disconnects and returns to the disconnected state 102. Typical prior art implementations wait in the idle state for a fixed time interval (e.g., between five (5) to twenty (20) seconds).

Network efficiency can be thought of as the resources which are used to transmit data (e.g., the consumed bandwidth, actual transmission time, etc.) divided by the total resources committed by the network (e.g., the bandwidth allocated, total timeslots, etc.) For example, in a time division multiplexing scheme having eight (8) timeslots, one idle device holds one (1) timeslot for the duration of the idle period; if all other timeslots are operating at full capacity, the network efficiency is 87.5% (seven (7) used timeslots divided by eight (8) assigned timeslots).

Consequently, even though an idle connection 106 uses fewer resources than an active connection 104, the idle state still requires bandwidth and processing resources to sustain the idle state connection. Thus, while longer idle periods can reduce the frequency of connection re-establishment (and the associated overhead), excessively long idle periods adversely affect overall network efficiency.

As previously mentioned, connection establishment can span from hundreds of milliseconds to several seconds; idle periods last between five (5) to twenty (20) seconds. Clearly, while idle periods reduce connection churn, the inefficient use of network resources during idle operation is less than optimal. A better solution is required. Ideally, network efficiency can be improved by eliminating inactive network use or reducing non-data signalling (e.g., idle mode operation, control signalling, etc.)

SUMMARY OF THE INVENTION

The present invention satisfies the aforementioned needs by providing improved methods and apparatus for reducing data transmission overhead by delaying transmission of data.

In a first aspect of the invention, a method of reducing data transmission overhead is disclosed. In one embodiment, the method includes: responsive to a connection request, queuing first data associated with the connection request; waiting for a delay period; queuing any second data accrued during the delay period; establishing a connection in accordance with the connection request; and transmitting the first data and any queued second data.

In a first variant, the delay period is stochastically determined.

In a second variant, the method terminates the connection immediately after the first data, and any queued second data, have been transmitted.

In a third variant, the method is implemented substantially within a wireless mobile device having a battery-based power supply, the method at least in part reducing power demands on the power supply. Moreover, the wireless mobile device may be adapted for use within a cellular network.

In a fourth variant, a duration of the delay period is related at least in part to the type of at least one of the first and second data being queued.

In still another variant, feedback is received from a receiver of the transmitted first data and any queued second data, and utilized to adjust a duration of the delay period.

In a second aspect of the invention, a communication apparatus is disclosed. In one embodiment, the communication apparatus includes a processing apparatus coupled to a communication interface; and a computer readable apparatus having a storage medium with at least one computer program stored thereon. The computer program is configured to, when executed on the processing apparatus, queue one or more first data, determine a delay period based on one or more parameters, and transmit the queued one or more first data after the delay period.

In a first variant, the at least one computer program additionally comprises instructions which when executed, randomize the determined delay period. In a second variant, at least one of the one or more parameters is based on transmission history.

In a third variant, the communication apparatus comprises a wireless mobile device having a battery-based power supply, and the queuing, determining and transmitting cooperate to at least in part reduce power demands on the power supply.

In a fourth variant, the communication interface is adapted for communication with a base station of a cellular network.

In a third aspect of the invention, a method for reducing data transmission overhead is disclosed. In one embodiment, the method comprises: receiving one or more data during a delay period; establishing a connection after the delay period; transmitting the one or more received data via the established connection; and immediately terminating the established connection after the transmitting is complete.

In one variant, the delay period is determined based at least in part on statistical analysis of historical data. In alternate variants, the delay period is determined based at least in part on feedback relating to one or more prior transmissions.

In another variant, the method additionally includes: receiving user input regarding the sufficiency of the delay period; and based at least in part on the user input, adjusting the delay period for subsequent data transmissions.

In a fourth aspect of the invention, a base station apparatus configured to facilitate reduced data transmission overhead is disclosed. In one embodiment, the base station apparatus includes: a processing apparatus coupled to a communication interface; and a computer readable apparatus having a storage medium with at least one computer program stored thereon. The at least one computer program is configured to, when executed on the processing apparatus: enable establishment of a connection with a mobile device; after the establishment, receive data transmitted by the mobile device via the connection, at least a portion of the data having been queued during a delay period invoked by the mobile device; terminate the established connection after the transmission of the data is complete; and transmit data relating to the delay period to the mobile device during a subsequent connection therebetween.

In a first variant, the base station apparatus is further configured to evaluate at least one parameter, and based at least in part on the evaluation, generate information indicating whether the delay period should be reduced or not, and transmit the information.

In a second variant, the transmitted data relating to the delay period comprises transmitted data useful to the mobile device in the mobile device's determining whether the delay period should be adjusted.

In yet another variant, the at least one computer program includes instructions for performing legacy data transmissions for one or more legacy devices, the instructions when executed: determine if the mobile device is a legacy device; and if the mobile device is a legacy device, transitions to an idle state after the transmission of data is complete.

In a fifth aspect of the invention, a computer readable medium is disclosed.

In a sixth aspect of the invention, a communications system is disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
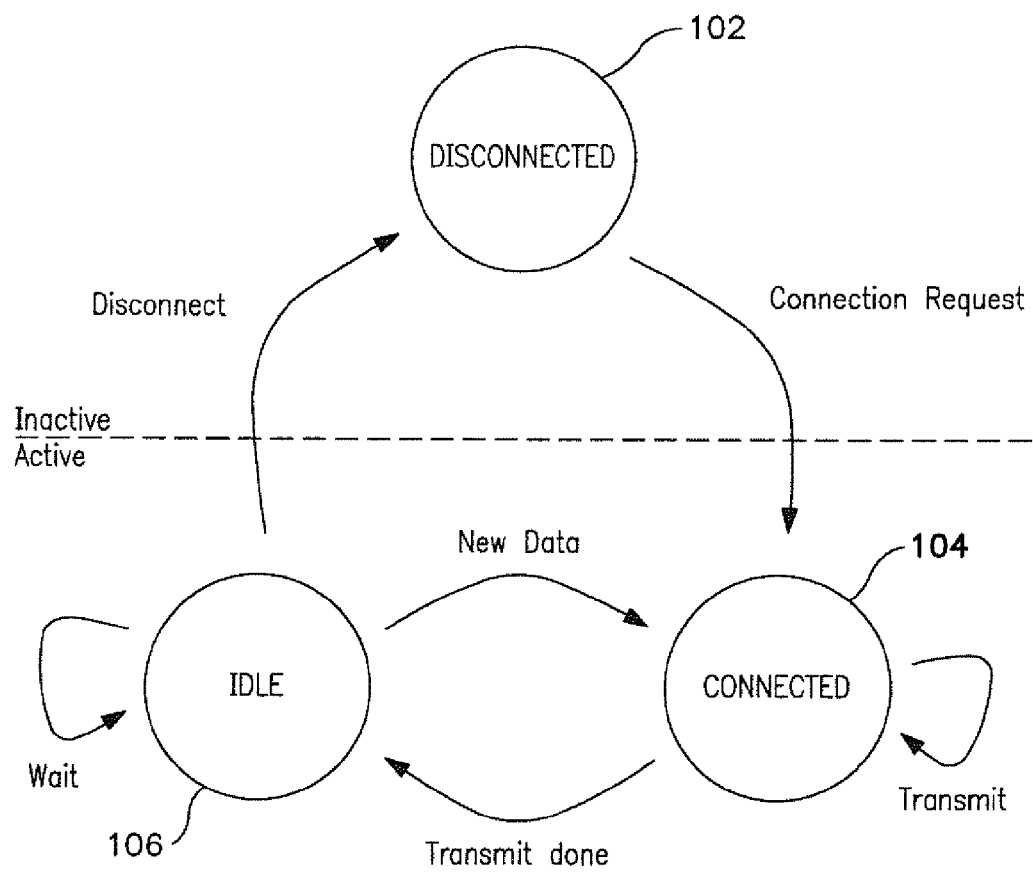
FIG. 1 is a graphical illustration of a state diagram illustrating a generalized prior art connection management scheme between two wireless peers.

Reference is now made to the drawings, wherein like numerals refer to like parts throughout.

Overview

Various aspects of the present invention encompass improved methods and apparatus for delaying connection establishment, and optimizing connection establishment behavior. More specifically, in one aspect of the invention, data is queued for a brief period before the connection is established (instead of keeping an idle connection open for a fixed period of time after transmission). After the queuing period, a connection is established, the queued data is transmitted, and the connection is immediately closed. There is no active connection during the queuing period (no resources are consumed, no power is used, etc.), and the queuing period can be used as an effective replacement for idle mode operation, In another aspect of the invention, transmission behavior is optimized based on stochastic functions that maximize one or more desirable traits (e.g., power consumption, network efficiency, etc.). The field of stochastic mathematics provides reasonably optimal behavior for inherently random systems. For example, unlike prior art systems which use fixed timer intervals, one exemplary embodiment queues data for a stochastically determined period of time. The stochastically determined time interval balances the likelihood of additional data during the queueing period against the adverse effects of excessive queueing periods. Moreover when used in combination with the aforementioned queuing period, the stochastically determined period of time can be adjusted without directly affecting other parties of the network. Thus, the present invention can be used if desired to individually tailor connections to each individual client of the network.

For example, one exemplary client device (e.g., a wireless handset) queues one or more first data, and waits for a stochastically determined period of time for additional data. After the stochastic queuing period, the client device transmits the queued first data and any additional data together. Immediately thereafter, the data connection is closed. The exemplary client device does not consume resources to sustain an idle state, which contributes to overall improvements in network efficiency.

Furthermore, the stochastic queuing period can be dynamically adjusted for the client device; for example, certain applications may prefer shorter queuing periods to improve operation, or alternatively, may be more tolerant of longer queuing periods (which improves network efficiency, power consumption, etc.)

Detailed Description of Exemplary Embodiments

Exemplary embodiments of the present invention are now described in detail. While these embodiments are primarily discussed in the context of a cellular network, it will be recognized by those of ordinary skill that the present invention is not so limited. In fact, the various aspects of the present invention are equally applicable to wireless and wired networks, including those with fixed or non-mobile devices, or any communication system (ad hoc, peer-to-peer, networked, etc.) that can benefit from the improved connection procedures and apparatus as described herein.

Example Operation—

Figure 2:
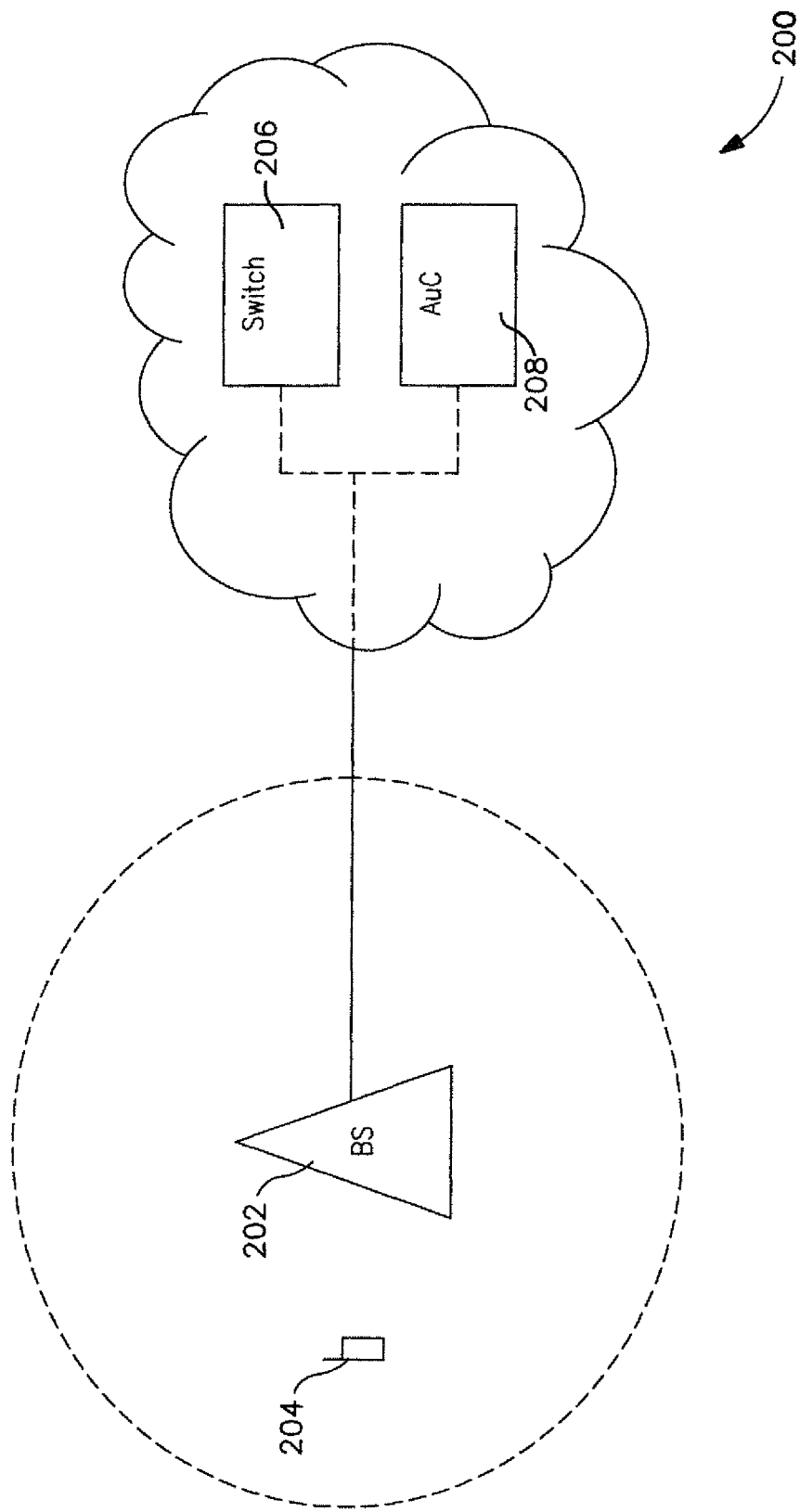
FIG. 2 is a graphical illustration of a typical cellular network comprising a Switching Center, Authentication Center (AuC), base station, and mobile device, useful with one embodiment of the present invention.

FIG. 2 illustrates one exemplary configuration of a cellular network 200 useful with various embodiments of the invention. A cellular radio system comprises a network of base stations 202, each of which provides radio coverage within a "cell" for a mobile device 204. The network of cells is managed by one or more network entities. Common network entities include, inter alit; switching centers 206, authentication centers 208, etc. For packet-switched (PS) networks, the data is routed via a cloud of "hops" between nodes; each packet can have a different routing path. For circuit-switched (CS) networks, data is routed via a static connection from source to destination; all data traverses the same routing path.

Figure 3:
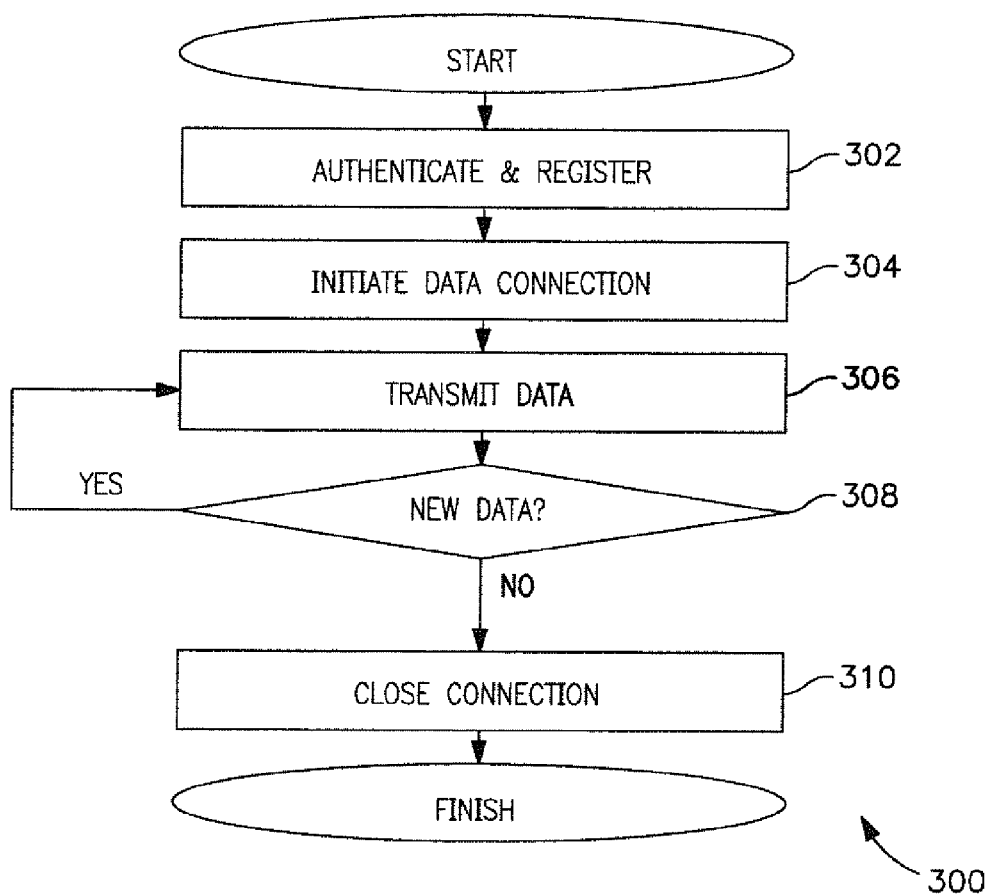
FIG. 3 is a logical flow diagram of a prior art process for transmitting data across a logical connection.

FIG. 3 graphically represents a prior art method for transmitting data via the cellular network 200. At step 302, the mobile device authenticates itself to the network, and registers with the nearby base station (or group of base stations). At step 304, the mobile device initiates a data connection to the base station it has most recently registered at (e.g., triggered by a user request, etc.) for example, to service a user initiated data session. Once the mobile device opens a connection to a base station; the connection carries messaging for a logical session between the mobile device and a destination device (e.g., another mobile device). The session bridges from the mobile device 204 to the base station 202, to the switching center 206 and through necessary network routing to the end destination.

Upon successful connection, the mobile device transmits data (step 306). Thereafter, the mobile device retains the connection for a fixed "idle" period (308). If subsequent data is available for transmission during this period, the existing connection is reused and the timer is reset (return to step 306), otherwise at the expiration of the idle period timer, the connection is closed (310).

In contrast to prior art operation, in one exemplary embodiment of the present invention, a wireless terminal delays opening a connection when it receives initial data transmission requests. During the delay, the terminal queues any subsequently available data. The queued data is sent through the connection at once, and the connection is immediately ended thereafter. Unlike the prior art method (e.g., FIG. 3) which maintains idle mode signalling for a short period of time after transmitting data, the exemplary device does not use idle mode signalling either before or after the data is transmitted. By eliminating idle mode signalling, network efficiency is improved, and power consumption within the mobile device is reduced.

Figure 4:
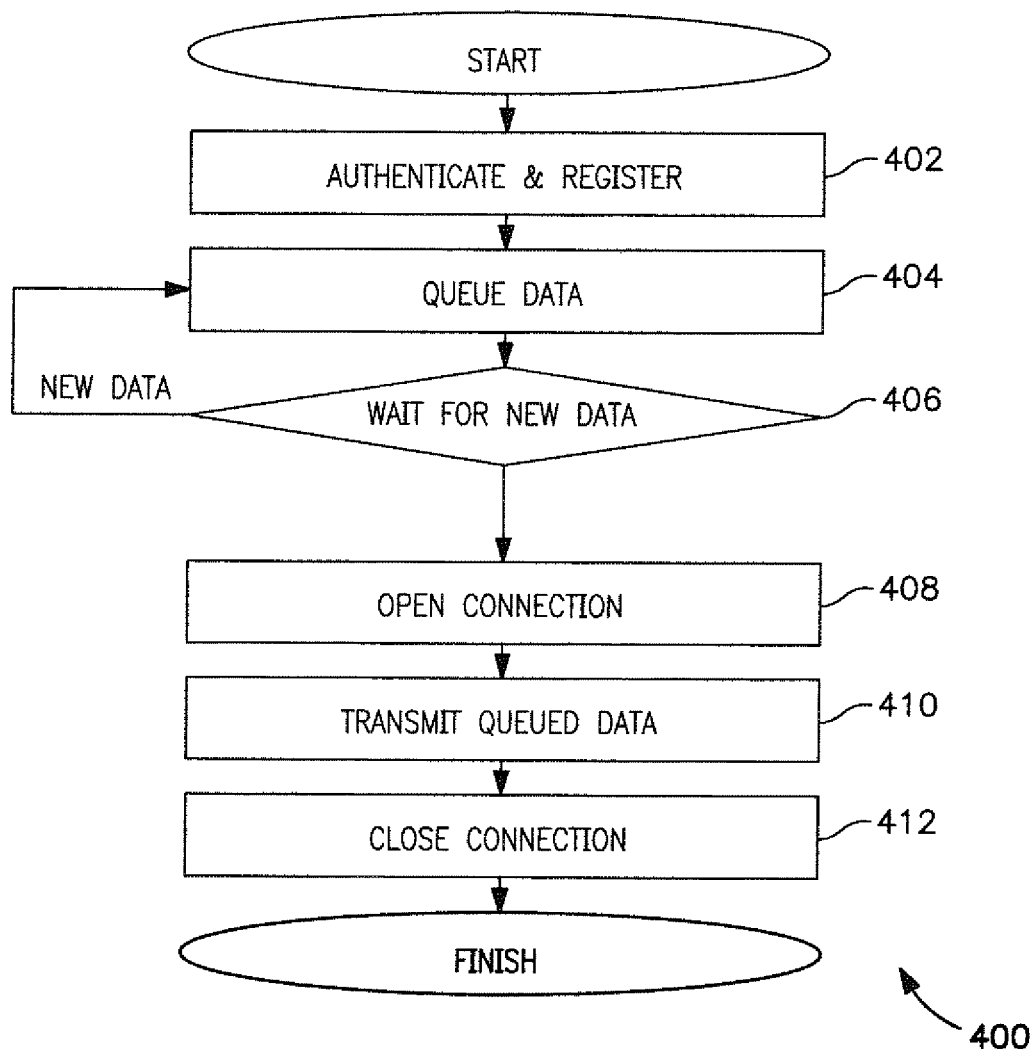
FIG. 4 is a logical flow diagram of an exemplary process for reducing network overhead by queuing data for transmission, in accordance with the present invention.

FIG. 4 graphically represents one specific embodiment of the inventive method in accordance with various aspects of the present invention. At step 402, the mobile device authenticates itself to the network, and registers with the nearby base station (or group of base stations). At step 404, the mobile device queues one or more first data for transmission (e.g., triggered by a user request, periodic or scheduled event, etc.).

At step 406, the mobile device postpones connection for a delay period. If any subsequent data becomes available for transmission during this delay period, the subsequent data is added to the transmission queue. It should be noted that during the delay period, data is only being queued; no connection is necessary.

During step 408, the mobile device opens a connection to the destination device (e.g., server, another device, etc.). Upon successful connection, the mobile device transmits data (step 410). Thereafter, the mobile device closes the connection (412).

Revisiting step 406, one exemplary embodiment adjusts the delay to optimize system performance based on one or more stochastic parameters. More precisely, the delay is based on a stochastic function that represents the probability of additional data being available for transmission within the delay period. For example, as described in greater detail subsequently herein, inputs to the stochastic function may include without limitation: (i) previous transmission history, (ii) current application use (e.g., type, bandwidth, etc.), and/or (iii) operational or business considerations.

As a brief aside, unlike deterministic events which have predictable behaviors, stochastic events are difficult to predict (e.g., too computationally complex to predict), impossible to predict (e.g., incomplete knowledge of system operation), or truly random (e.g., weather conditions, etc.). Common stochastic events include e.g., non-ideal fading, software/hardware interrupt service routines, network congestion, etc. Stochastic functions are used to, inter alia, characterize the likelihood of occurrence for stochastic events, and/or events which cannot be otherwise modeled. More detailed discussion of stochastic operation follows subsequently herein.

Figure 5:
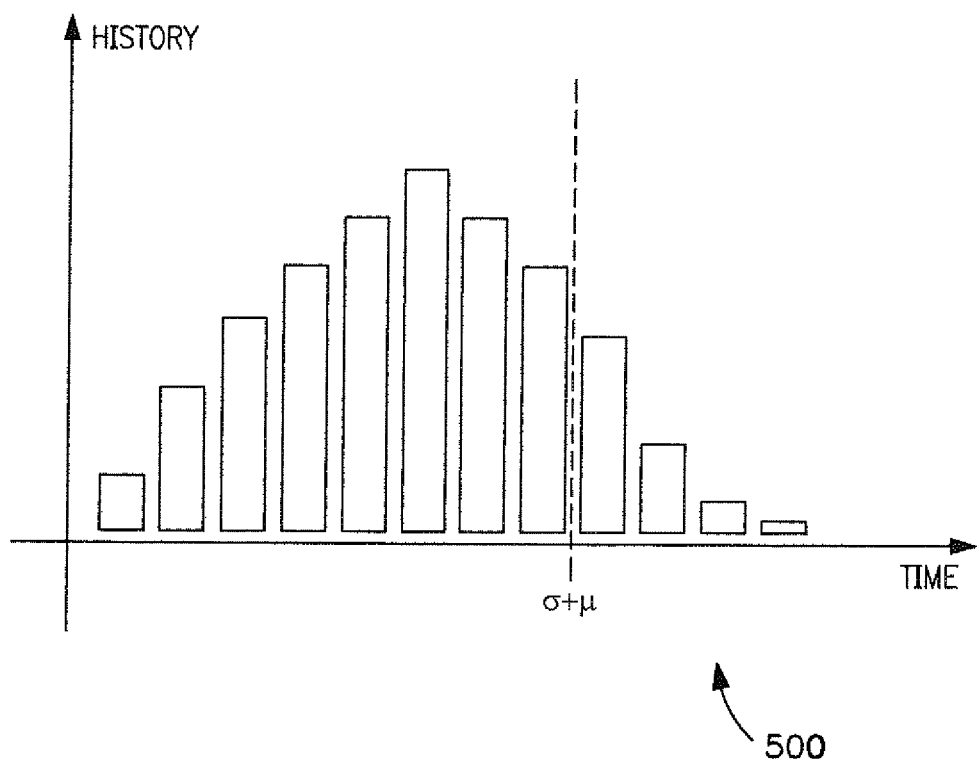
FIG. 5 is a histogram representing a history of data transmissions as a function of time according to one embodiment of the present invention.

FIG. 5 is an exemplary histogram 500 that represents historical availability of second data at a time after a request for data transmission of first data for a hypothetical mobile device. The availability of second data after the first data transmission is a stochastic event that does not exhibit predictable behavior. As shown, the histogram comprises a running count of the number of times the second data has arrived within a window of time after an initial transmission. In certain applications, data such as the previous transmission history shown in FIG. 5 is a good indication or predictor of future transmission requirements.

In the illustrated example, a standard arithmetic mean and standard deviation (s) calculation is used to determine the appropriate time delay. The mean is calculated by adding the values of the histogram 500, and dividing by the number of buckets (time slots) (see Eqn. 1). The deviation is the square of the sum of the square of the difference of the value from the mean average, divided by the total number of elements (see Eqn. 2). The time interval is the sum of the mean and standard deviation (see Eqn. 3).

The equations are represented below:

$$M=(x_1+x_2+\ldots+x_N)/N \quad \text{(Eqn. 1)}$$

where:

$\mu$=Mean $x_n$=Value of $n^{th}$ element; and

N=Number of elements $$s=V((x_1-\mu)^2+(x_2-\mu)^2+\ldots+(x_N-\mu)^2)/N) \quad \text{(Eqn. 2)}$$

where:
s=Standard deviation
μ=Mean
$x_n$=Value of $n^{th}$ element; and
N=Number of elements.

$$d = s + \mu \qquad \text{(Eqn. 3)}$$

where:
d=Delay interval
s=Standard deviation
μ=Mean

The result of the stochastic function is overlaid on the histogram of FIG. 5. If the previous transmission history is also representative of future transmission likelihood, then the majority of subsequent data transmissions will become available within the calculated delay.

The function may also be updated frequently (or continuously) with new information (resulting in new delay values). Alternately, if performance is satisfactory, the delay period may be left "as is". In yet other embodiments, the delay period calculation may be triggered by specified events or patterns; e.g., opening or closing applications, network congestion, excessive connection "churn" (rapid opening and closing of connections), etc.

Different variants or versions of the foregoing operating model are contemplated by the invention, including e.g., (i) a priori version, and (ii) feedback version. In the a priori version, information regarding data patterns and/or delays is known in advance, and utilized according to e.g., the schema described above. In the feedback version (which may or may not be combined with the a priori version), actual data from the operation of the system may be "fed back" into the model to dynamically update it and correct it for observed behaviors or patterns; i.e., the system can learn from ongoing operations. Similarly, such as in the case of QoS-related requirements, the receiver (e.g., base station) can negotiate with the transmitter (e.g., handset) to set maximum delay requirements and/or other parameters so as to maintain the desired QoS. This negotiation can be performed: (i) in advance of connection setup; (ii) during connection setup; or (iii) according to a feedback model, wherein the transmitter selects the delay period itself (e.g., without having any a priori knowledge of what the receiver's requirements are), and then adjusts this period dynamically based on feedback received from the receiver, such as at the next connection by the transmitter. For instance, a simple "decrease/don't decrease" type model could be employed where, based on the receiver's determination of whether its QoS requirements are being met, could send either a "decrease" message (i.e., reduce transmission/queuing delay), or "don't decrease" message (i.e., things are OK as they are, so delay can be held constant, or an increase can be attempted).

Alternatively, the receiver can send back "raw" data useful in the determination of an appropriate delay period to the transmitter (e.g., handset), wherein the handset itself can utilize this raw data for determining the appropriate delay (as opposed to the receiver performing the determination). Splitting of this determination between the transmitter and receiver is also contemplated, depending on the capabilities of the respective devices, operating conditions, and so forth.

Various other schemes will be recognized of ordinary skill given the present disclosure.

Methods—

The following discussion provides methods for reducing data transmission overhead. In a first aspect of the present invention, initial data queued for a delay period before transmission; any data arriving during the delay period is added to the initial queued data for transmission. In a second aspect of the invention, the method uses a stochastic function to adjust transmission behavior to optimize operation.

Generally, wireless devices have both transmit and receive capabilities, and can transmit and receive signals simultaneously. However, for the purposes of clarity in the following discussion, the terms "transmit", "transmitter", "transmitting", etc. generally relate to the device that is queuing data for subsequent transmission. The terms "receive", "receiver", "receiving", etc. describe the peer device which will receive the transmitted queued data.

Figure 6:
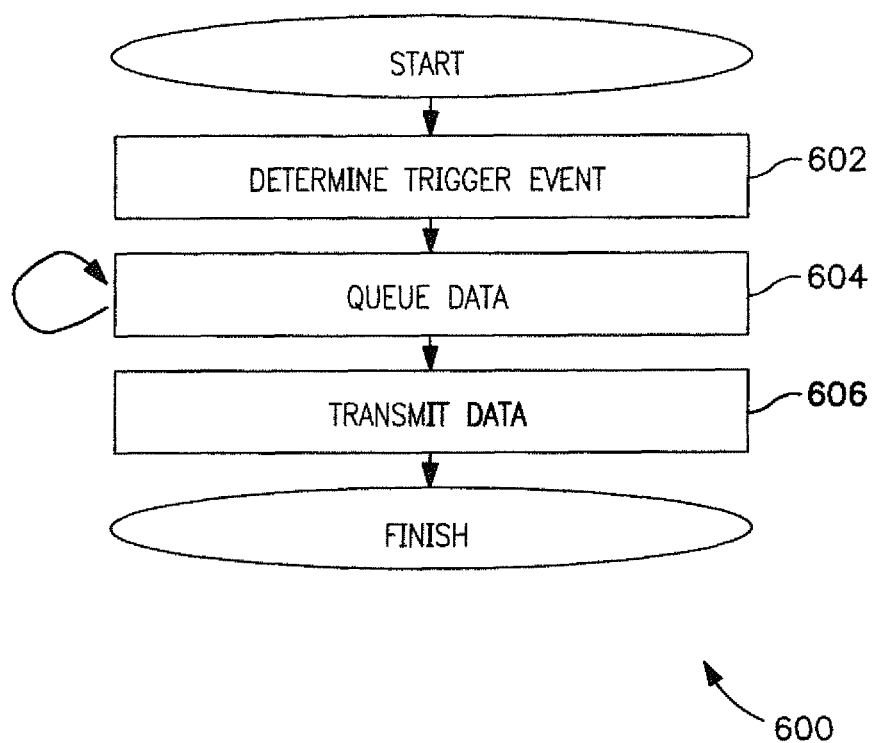
FIG. 6 is a logical flow diagram of a generalized process for reducing network overhead, in accordance with the present invention.

FIG. 6 illustrates one exemplary generalized method 600 for reducing data transmission overhead according to the present invention.

At step 602 of FIG. 6, data which is available for transmission is postponed until a transmission event. In one embodiment, the transmission event is a timer set to expire after a set time interval. In other embodiments, the transmission event is a command or other type of event; e.g., the user of the transmitting device may be presented with a user interface button to "transmit"; the user can decide when to execute the transmission. In yet other embodiments, the transmission event is based on a device event; e.g., a buffer filling. For example, a device may wait for a message buffer to fill beyond a threshold capacity before executing transmission, etc. Yet other suitable transmission events will be readily recognized implemented by ones having ordinary skill in the related arts, given the contents of the present disclosure.

Within time interval based embodiments, a wide variety of methods for determining a suitable time interval are described hereinafter. Time intervals are generally implementation specific, and can be dynamic, static, fixed, etc. A fixed time interval does not change, and can be used for simple implementations. For example, a very simple transmitter may be hard-coded to use a five (5) second time interval. More complex apparatus may support a static interval, which is static during operation, but which can be updated or changed. One example of a static time embodiment provides update messages (e.g., during registration, on basic control channels, etc.) to transmitters, where the updates include information dictating a suitable timer interval. Yet more complicated systems can use dynamically adjusted time intervals to optimize operation. Dynamic time intervals are described in greater detail hereinafter.

In one embodiment, the time interval is set by the transmitter (based on transmitter considerations such as e.g., quality of service, power consumption, etc.). Alternatively, the time interval determination is set ahead of time (e.g., by a control message received during initial registration (step 302 of FIG. 3), etc.) by the receiver (based on receiver considerations e.g., business considerations, network congestion, etc.) Yet other implementations may utilize a combination of receiver and transmitter determination; for example, a network may publish one or more parameters (e.g., current usage, capabilities, congestion notification, etc.), the one or more parameters being interpreted in conjunction with user terminal specific information (e.g., currently running applications, capabilities, power consumption, etc.).

In one configuration, the time interval is set based on parameters specific to the data connection request. For example, a user may wish to send a text message, transmit a file, etc. Responsively, the transmitter calculates an appropriate time interval based on the data connection request type; e.g., a text message can support a long time interval, whereas time sensitive data may require very short time interval operation.

In other embodiments, the time interval is set based on parameters provided by the receiver. For example, a base station can flag (during or prior to) an impending network congestion event. Similarly, the time interval can be established during mobility control events, such as registration with a new network, hand-over, multi-mode operation, etc. In one such variant, the transmitter causes a receiver to calculate the time interval and provide the information back to the transmitter.

As yet another alternative, the time interval can be based on a user configurable parameter. A user (or software application) may prefer latency over performance, or vice versa. For example, a user could enable inventive operation in a "power saver" mode, and use prior art operation for "normal" mode. In another example, the time interval may change based on a schedule e.g., the user may schedule power saver mode during off-hours, resuming normal operation during the day.

Referring now to exemplary command based transmission events, these command based events can be initiated by either (i) the user or software of the transmitter, or (ii) the receiver (e.g., base station, peer device, etc.). In one embodiment, the transmitter provides a user interface enabling the user to cause a transmission event (e.g., a "send" button or function, etc.) In an alternate embodiment, the receiver generates transmission events to "pull" data from the transmitter. For example, during network lulls, a base station can broadcast a signal or poll message to pull data from nearby devices; responsively, any nearby mobile devices transmit queued data. In another example, a fleet tracking station can pull data from passing fleet vehicles (e.g., shipment data, time data, etc.). In one variant, such pull mode operation may include additional information e.g., to stagger uploads, to address particular devices, specify information desired, configure the reply, etc.

Additionally, device events can be used as transmission events. In one such embodiment, the transmission event is based on buffer fullness. For example, for delay insensitive applications, data transmission can be postponed for long periods of time, provided that a buffer is not overrun, etc. As used herein, buffer "fullness" refers to the amount of content stored within the buffer, relative to its overall capacity. For example, one such trigger event could be the buffer exceeding a defined threshold or percentage of fullness, or even a rate of change of fullness ("fill up rate").

Buffer sizes are generally implementation-specific, and can be dynamic, static, fixed, etc. A fixed buffer size does not change, and can be used for simple implementations. For example, a very simple mobile device can use a simple memory device (e.g., a solid state Random Access Memory (RAM) element). More complex buffer implementations may support a static size, which is statically sized during operation, but may change due to other circumstances. For example, software implementations commonly use statically sized memory buffers in memory management (e.g., to avoid memory overruns, invalid memory accesses, etc.) Yet more complicated systems can use dynamically adjusted buffer sizes to optimize operation. Dynamic buffer sizing is described in greater detail hereinafter.

Other device events can include component status and error conditions. In such embodiments, the transmitting device can set a transmission event based on one or more component status, state, configuration, or error conditions. For example, a record logging system may automatically transmit logs of component status when a component has failed, or periodic reports can be issued when a device enters a given operating mode or condition.

Yet other trigger conditions will be readily apparent to artisans having ordinary skill in the arts, given the contents of the present disclosure.

At step 604, the transmitter queues data until the determined transmission event. In one exemplary embodiment of the present invention, one or more data is queued according to a first data connection request; thereafter, any new data from subsequent data connection requests are additionally added to the queue.

As previously described, transmission events can be (i) time interval based, (ii) command based, (iii) event based, or otherwise. In time interval embodiments the transmitter queues data for the time interval. Similarly, in event based embodiments, the transmitter queues data until the device event occurs (e.g., a buffer overlap, an error flag, etc.). In command based embodiments, data is queued until the transmitter is commanded to transmit the queued data. Furthermore, ones having ordinary skill in the related arts, can readily combine one or more of the foregoing transmission event scenarios or models, given the contents of the present disclosure.

For example, in one such combined embodiment, data is queued within the buffer until any of (i) a time interval expires, (ii) a buffer overruns, or (iii) the user forces the transmission of data. Responsive to any of these events occurring, the transmitter jumps to step 606 of the method 600.

It is also appreciated that in some embodiments, data is being continuously queued (e.g., no data connection request is necessary). In such embodiments, the transmitter is queuing data for transmission. Once the transmission event occurs, the transmitter can transmit its queued data. Such implementations may be particularly useful in automated systems e.g., fleet tracking, inventory management, etc.

Responsive to the transmission event, the transmitter transmits the queued data at step 606. In one exemplary embodiment, the transmitter opens a connection for data transfer. In alternate embodiments, the transmitter determines if opening a connection for data transfer is appropriate, given its currently queued data. If the transmitter determines that the data transfer is appropriate, the transmitter transmits the data; otherwise, the transmitter repeats the process (e.g., returning to either step 602 to determine a new transmission event, or step 604 to continue queuing data). After successfully transmitting the queued data, the transmitter closes the data connection.

For implementations which use past history to predict future transmission probabilities (e.g., histograms, etc.), "metadata" may be continuously catalogued for future use. Within the context of the present invention, metadata is used for example to describe historic statistics about the transmitter, and may include information such as (i) amount of data, (ii) time of arrival of data, (iii) frequency of new data, (iv) type of data, (v) data burst sizes, (vi) data burst types, (vii) source application, (viii) destination application, (ix) QoS or other timing/quality requirements, etc.

Metadata types are widely varied. In one exemplary embodiment, metadata is a simple tally and bucketing system (see FIG. 5, and accompanying discussion). Logging may comprise incrementing an appropriate bucket counter. In more complex implementations, metadata may comprise multiple fields, and field types. For example, more complicated metadata can be implemented within a specialized language e.g., XML (eXtensible Markup Language, etc.).

Stochastic Functions

While the foregoing discussion has described one aspect of the present invention (delaying initial data for a delay period and queuing data arriving during the delay period for transmission), a second salient aspect of the invention relates to the use of stochastic analysis to dynamically adjust transmission behavior, thereby maximizing one or more desirable parameters (e.g., power consumption, processing complexity, etc.) Stochastic functions can be used in combination with the aforementioned delayed operation; however, ones having ordinary skill in the related arts will recognize, given the teachings of the present disclosure, that stochastic analysis can also be used in combination with prior art methods. For example, stochastic functions can be used to determine delay periods, idle periods, buffer sizes, transmission power, etc.

As previously noted, at least one deficiency of prior art solutions is the use of fixed or static idle periods; for example, prior art solutions use idle periods lasting between five (5) to twenty (20) seconds. While fixed and static time intervals are simple to implement in hardware, the present invention contemplates additional improvements to operation, using stochastic functions to adjust operation. Referring back to the exemplary histogram 500 of FIG. 5 (i.e., the histogram representing the historical availability of second data at a time after a request for data transmission of first data), increasing the queuing period increases the probability of successfully queuing first and second data. For FIG. 5, approximately 50% of second data arrives within μ a time (the mean average); at time μ+s (one standard deviation over the mean average) that percentage increases to approximately 85%. However, excessive time intervals may directly, or indirectly, adversely impact application operation, user experience, etc. Hence, the time interval should in many cases be balanced between performance and efficiency.

In effect, the network efficiency improvements are gained by reducing device performance. Consequently, various aspects of the present invention are directed to simple solutions for implementing dynamic operation, thereby optimizing the tradeoff between e.g., network efficiency and performance.

In one embodiment, a transmitter uses a histogram to model stochastic events, and to optimize a transmission time interval; the transmitter uses the histogram to predict future behavior. Histograms can be implemented simply and cheaply in mobile devices, such as with bucket or bin counters of the type well known in the art. Common variations of histogram functions include for example cumulative histograms (each bucket includes the sum of all prior entries), assymetric histograms (each bucket has a different "range"), weighted histograms (each bucket has a different weight), etc., although it will be appreciated that other schemes (histogram-based or otherwise) may be used as well consistent with the invention. For example, a moving window or average type approach can be used consistent with the invention; e.g., such as where the histogram of FIG. 5 is populated with data obtained from a moving time window such as the last 30 calendar days.

In another embodiment, a device uses a probability distribution function to model stochastic events. In one exemplary implementation, the transmitter calculates a probability distribution function based on one or more related parameters (e.g., Gaussian distribution with a mean of ten (10) seconds, and a standard deviation of five (5) seconds etc.). In some variants, parameters may be provided e.g., by a software application, by a receiver, etc. For example, the receiver may specify a Gaussian distribution and provide parameters such as the mean, and the variance. Irregular distributions may require further parameterization; e.g., the receiver may include parameters such as, inter alia, mode, median, skewness, kurtosis, etc. In yet other variants, a transmitter determines appropriate parameters based on one or more monitored conditions. For example, if the transmitter is operating within a noisy network environment, network efficiency may be more important than device performance or vice versa. The mobile device may for instance switch between a short time interval and a long time interval, if radio interference exceeds a noise threshold.

In another example, if the transmitter is operating with limited battery capabilities (or other power source limitations), power consumption may be more important than device performance, network efficiency, etc. In one such example, the mobile device can increase the time interval to improve the likelihood of queuing data. By increasing the likelihood of queuing data, the transmitter can use its transmitter less frequently, which reduces power consumption. However, for very infrequent use, the mobile device can actually decrease the time interval instead. By decreasing the time interval, the device powers down faster (i.e., instead of waiting for the time interval to expire). The selection for whether to increase or decrease time intervals to improve power consumption depends on device usage; however, artisans of ordinary skill will easily recognize other suitable schemes or criteria which may be used as the basis of decision logic, given the contents of the present disclosure.

Furthermore, stochastic analysis is not limited to time interval determination. In addition to time-related uses, stochastic analysis can be used to determine other transmission behaviors, such as buffer sizes, transmission power, etc. For example, well known communication systems provide buffering capabilities for streaming media transfer. Larger buffer sizes can improve transfer and playback by improving tolerance for lost signaling; etc., however larger buffer sizes can detract form overall system memory, and increase device power consumption. Consequently, various aspects of the present invention can be used to optimize buffer allocation.

In another example, based on previous media usage, a device may allocate more or less memory for media playback. In one embodiment, a device measures the frequency of buffer overruns (i.e., during a buffer overrun the data rate exceeds the rate of transfer, such that the buffer memory overflows). Based on an acceptable likelihood of buffer overrun given historic probabilities, the device can lower buffer memory allocations. For instance, a relatively low priority media stream (such as advertising), could be allocated a smaller sized video buffer memory. In this example, buffer overruns on the low priority buffer are tolerated, and the saved memory can be used for other higher priority tasks (such as primary content delivery/processing).

In yet other embodiments, instead of allowing a buffer overrun, the device may force transmission. Accordingly, buffer size is directly related to transmission frequency; smaller buffers must transmit more frequently. In such embodiments, the buffer size can be adjusted to optimize buffer size, without requiring excessive transmission frequency.

Similarly, higher transmission power can improve signal reception and signal quality. However, excessive transmit power will interfere with other devices. Existing solutions for power management rely on simple feedback loops. Accordingly, in one embodiment of the present invention, a device can increase or decrease transmission power and/or reception gain based on stochastic parameters; e.g., to combat fast fading, etc.

Yet other analogous structures and uses for the aforementioned stochastic analysis will be clear to artisans of ordinary skill, given the contents of the present disclosure.

Exemplary Apparatus—

Figure 7:
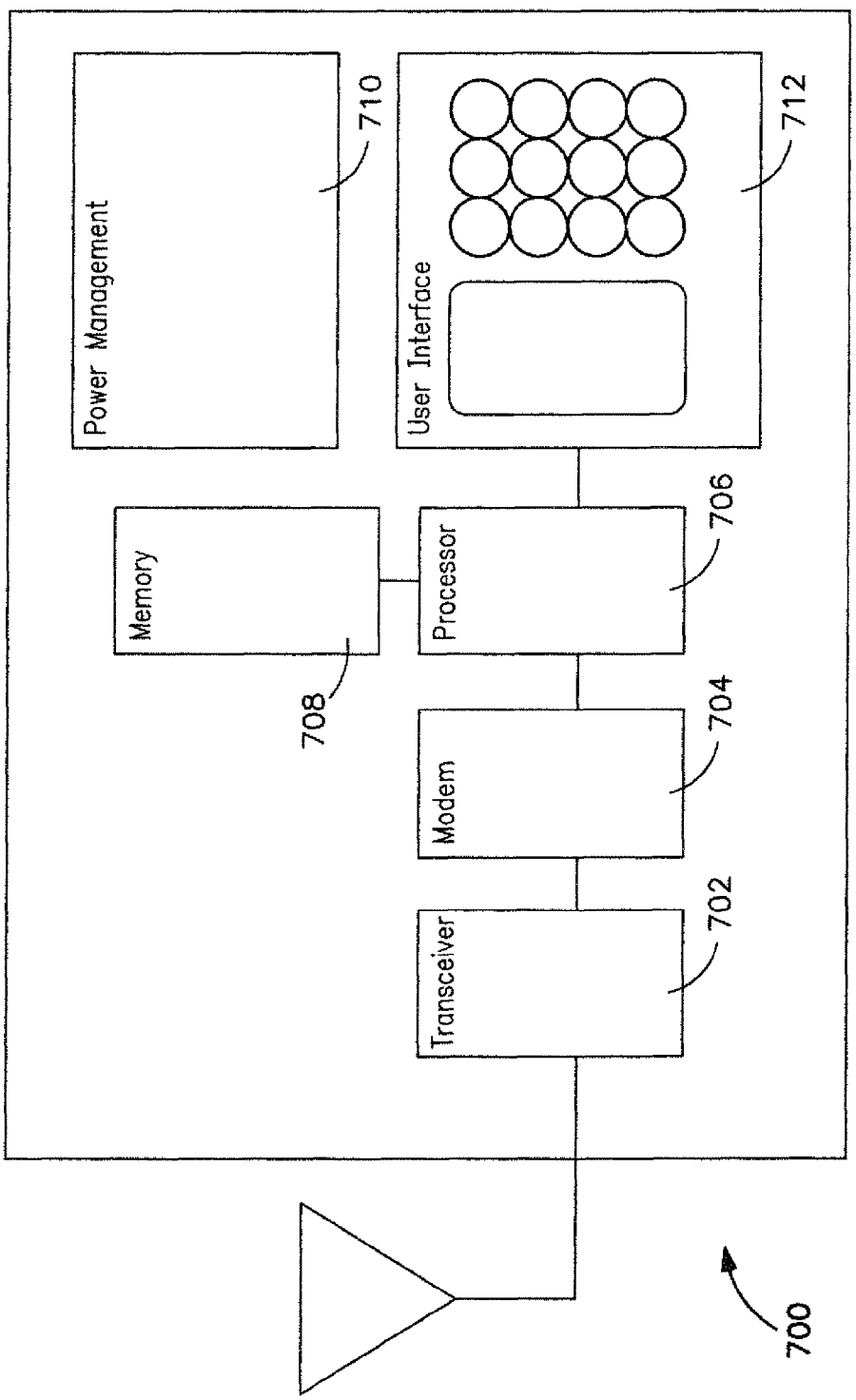
FIG. 7 is a block diagram of one embodiment of a wireless client apparatus configured in accordance with the present invention.

Referring now to FIG. 7, exemplary apparatus 700 for implementing the methods of the present invention is illustrated.

The apparatus 700 includes a processor subsystem 706 such as a digital signal processor, microprocessor, field-programmable gate array, or plurality of processing components mounted on one or more substrates. The processing subsystem 706 is connected to a memory subsystem 708. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

In one exemplary embodiment, the memory subsystem 708 includes a buffer. In one such variant, the buffer is a dynamically sized buffer. For example, the buffer can be dynamically sized in consideration of software requirements, power consumption, radio use, network congestion, etc. In alternate examples, the buffer can be fixed in size; for instance, a fixed size dedicated memory component can be used to queue data (e.g., 256K RAM, 512K RAM, etc.). Fixed buffer sizes can also be designated within software or firmware, based on other operational considerations (e.g., amount of available memory, etc.).

The exemplary buffer operates according to a First-In-First-Out (FIFO) buffer. FIFO buffers preserve the order of data i.e., data is transmitted in the order which it is received. Other buffer constructions are widely used throughout the related arts. Some common buffer implementations include, inter alia, Last-In-First-Out (LIFO) buffers, circular buffers, prioritized buffers, etc. For example, a software managed buffer variant can provide varying degrees of latency for data can be handled with prioritized buffers by prioritizing low latency data (e.g., isochronous streaming data) at a higher priority than more flexible data (e.g., asynchronous data transfer).

In the exemplary embodiment, the processor is coupled to a wireless interface comprising a modem 704 and transceiver 702, useful for driving one or more transmission media (e.g., fiber optic, copper wire, electromagnetic spectrum, etc.). As previously described, in one exemplary embodiment the apparatus 700 is adapted to operate within a cellular network. Common cellular networks include GSM, EDGE, UMTS, IS-95, IS-2000, etc. Advanced wireless technologies include LTE, LTE-Advanced, WiMAX, etc.

In one embodiment, the processor is coupled to a user interface 712. The user interface system 712 includes any number of well-known I/O including, without limitation: a keypad, touch screen, LCD display, backlight, speaker, and microphone. However, it is recognized that in certain applications, one or more of these components may be obviated. For example, PCMCIA card type embodiments may lack a user interface (as they could piggyback onto the user interface of the device to which they are physically and/or electrically coupled).

The apparatus of FIG. 7 generally further includes additional devices including, without limitation, additional processors, one or more GPS transceivers, or network interfaces such as IrDA ports, Bluetooth transceivers, Wi-Fi (IEEE Std. 802.11) transceivers, USB (e.g., USB 2.0, USB 3.0, Wireless USB, etc.), FireWire, etc. It is however recognized that these components are not necessarily required for operation of the apparatus 700 in accordance with the principles of the present invention.

The illustrated power management subsystem (PMS) 710 provides power to the apparatus, and may comprise an integrated circuit and or a plurality of discrete electrical components. In one exemplary portable apparatus, the power management subsystem 710 advantageously interfaces with a battery.

It is further recognized that the apparatus of FIG. 7 may take on any number of different form factors. For instance, the apparatus 700 may be a desktop or tower computer. It may also be a laptop or handheld computer, personal media device, PDA, mobile smartphone, server blade, plug-in card to a larger host device, display device or monitor, RAID array or storage device, network hub, and so forth.

Figure 8:
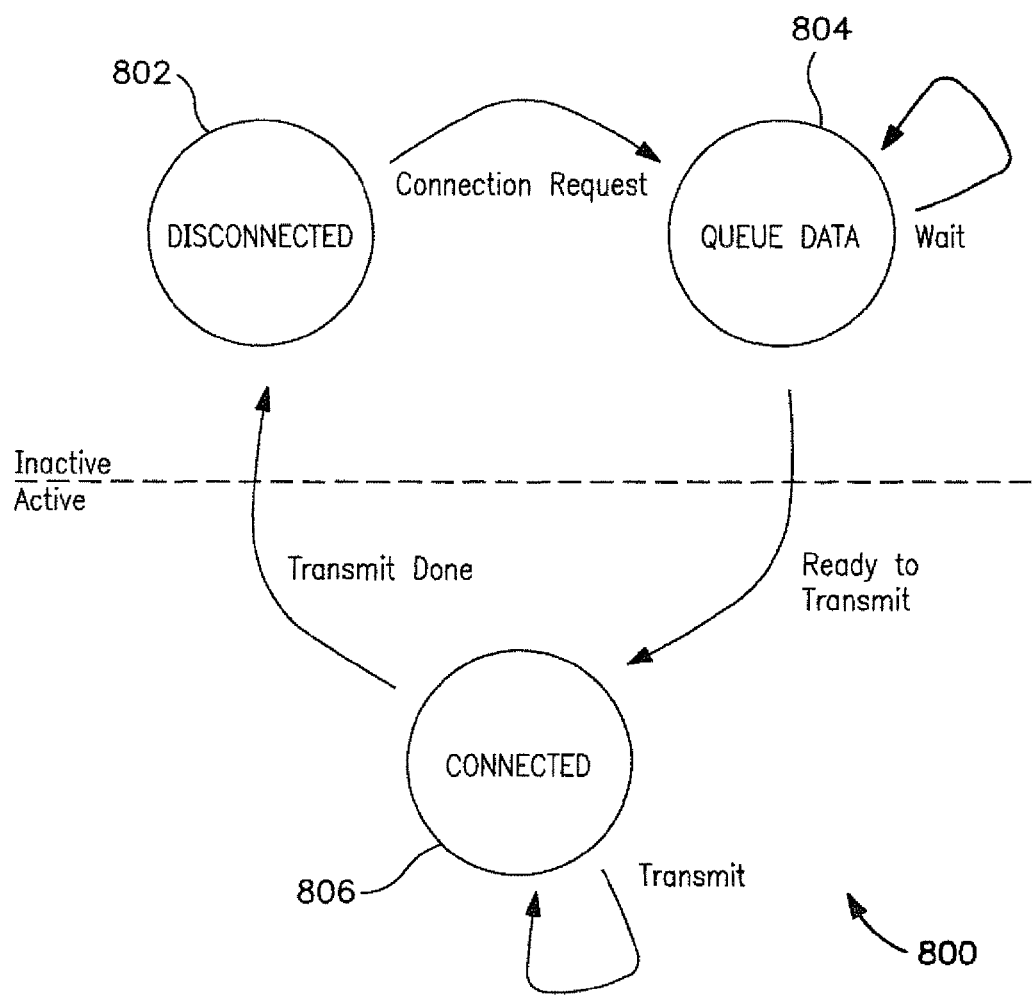
FIG. 8 is a graphical illustration of a state diagram for connection management between two wireless peers according to one exemplary embodiment of the present invention.

Referring now to FIG. 8, one exemplary state diagram for the exemplary apparatus 700 is shown. In the disconnected state 802, a first device does not have a connection to any peer devices. Responsive to a connection request (e.g., initiated by a user, etc.), the first device transitions to a queue data state 804; during the queue data state, any subsequently received data is queued for transmission.

When the device is ready to transmit e.g., after a timer expiration, threshold buffer fullness, etc., the first device opens a connection, and transmits data in the connected state 806. Once the first device has finished transmitting its data, the first device transitions to the disconnected state 802. In contrast to the prior art state machine illustrated in FIG. 1, the device of FIG. 8 is only connected for the connected state.

Other device variants are readily implemented by an artisan of ordinary skill, given the present disclosure.

Business Methods and Rules—

Various aspects of the present invention balance trade-offs between desirable and undesirable traits. In one exemplary embodiment, the network and user trade data latency, for network overhead. As data latency decreases, network overhead increases, and vice versa. While low data latency is desirable, excessive network overhead is not.

Consider the case where a network entity (e.g., base station, or an associated processing entity) uses a stochastic function to optimize performance versus one or more business or operational considerations (e.g., profitability). For example, a network may be able to serve certain upgraded or premium clients preferentially, such as by giving these upgraded clients shorter time intervals (reducing latency), at the possible cost of increased chum, and resulting network inefficiency. Similarly, a mixed network, servicing both legacy and invention-enabled devices can decrease idle time, and adjust the delay interval on a per-user or "granular" basis. It is worth noting that reducing idle time reduces the effectiveness of prior art terminals, but improves network utilization. The improvement to network utilization can hence be meted out to individual ones of the invention-enabled population, such as according to a prescribed hierarchy or business rule.

Business methods can be employed to monetize the "cost" of such trade-offs, thereby enabling a network operator to make the most profitable business decisions. For example, increasing latency improves network efficiency, yet also adversely affects perceived service quality. Thus, in one embodiment of the invention, a business rules engine related to network efficiency is provided. This engine comprises, in an exemplary embodiment, a series of software routines or other associated hardware/firmware environment adapted to control one or more parameters necessary to determine appropriate delay intervals, or buffer depths.

In effect, the business rules engine comprises a supervisory entity that monitors and selectively controls the congestion management, and avoidance functions at a business (e.g., revenue, profit, and/or QoS level), so as to implement desired business rules. For example, the foregoing invention is well suited to providing high data rates in relatively pristine reception conditions. Thus, in one such model, a service provider/network operator may provide low data latency data services to customers willing to pay a premium, as an incentive for its higher-tier customers, or even subsidized by other $3^{rd}$ parties.

Certain business models may offer such desirable qualities embodied in premium equipment. For example, home use femtocells may support such preferential services; generally femtocells are less concerned with overall network efficiency, and can offer very low data latencies without creating adverse effects. In yet other models, a cellular network operator may provide various levels of data latency. For instance, all mobile devices with low data latency requirements may be grouped within a first class, and higher data latency mobile devices may be grouped within a second class. Service may be provided to both first and second class devices, however the first devices will receive preferential treatment.

Myriad other schemes for implementing business methods for exploiting delayed transmission will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Base station apparatus configured to facilitate reduced data transmission overhead, comprising:
   a processing apparatus coupled to a communication interface; and
   a computer readable apparatus having a storage medium with at least one computer program stored thereon, the at least one computer program configured to, when executed on the processing apparatus:
   enable establishment of a connection with a mobile device;
   after the establishment, receive data transmitted by the mobile device via the connection, at least a portion of the data having been queued during a delay period invoked by the mobile device;
   terminate the established connection after the transmission of the data is complete; and
   transmit data relating to the delay period to the mobile device during a subsequent connection therebetween.

2. The base station apparatus of claim 1, wherein:
   the base station apparatus is further configured to evaluate at least one parameter, and based at least in part on the evaluation, generate information indicating whether the delay period should be reduced or not; and
   the transmitting data relating to the delay period comprises transmitting the information.

3. The base station apparatus of claim 1, wherein the transmitted data relating to the delay period comprises transmitted data useful to the mobile device in the mobile device's determining whether the delay period should be adjusted.

4. The base station apparatus of claim 1, where the at least one computer program includes instructions for performing legacy data transmissions for one or more legacy devices, the instructions when executed:
   determine if the mobile device is a legacy device; and
   if the mobile device is a legacy device, transition to an idle state after the transmission of data is complete.

5. A method for facilitating reduced data transmission overhead, comprising:
   establishing a connection with a mobile device;
   receiving data transmitted by the mobile device via the established connection, where at least a portion of the received data comprises one or more data that has been queued during a delay period invoked by the mobile device;
   terminating the established connection after receiving the data; and
   transmit a second data that relates to the delay period to the mobile device during a subsequent connection therebetween.

6. The method of claim 5, where the delay period invoked by the mobile device is based at least in part on a data type associated with the one or more queued data.

7. The method of claim 5, where the delay period invoked by the mobile device is stochastically determined by the mobile device.

8. The method of claim 5, further comprising determining whether the delay period should be reduced, and where the second data that relates to the delay period comprises an instruction to increase or decrease the delay period.

9. The method of claim 8, where the determining is based at least in part on a quality of service (QoS) requirement.

10. The method of claim 5, where the second data that relates to the delay period comprises information useful for determining whether the delay period should be reduced.

11. The method of claim 5, where the second data includes comprises a time requirement or quality of service (QoS) requirement associated with the subsequent connection.

12. A method for reducing data transmission overhead, comprising:
   invoking a delay period at a mobile device;
   queuing data during the invoked delay period;
   establishing a connection with a base station;
   transmitting at least a portion of the data queued during the delay period to the base station;
   responsive to the transmission of at least the portion of the data completing, causing the termination of the established connection; and
   receiving a second data that relates to the delay period during a subsequent connection between the mobile device and the base station.

13. The method of claim 12, where the delay period is based on a histogram of one or more previous connection parameters.

14. The method of claim 13, where the one or more previous connection parameters include an idle time interval.

15. The method of claim 13, where the one or more previous connection parameters include an amount of buffered data.

16. The method of claim 13, where the one or more previous connection parameters include an amount of transmission power.

17. A mobile device configured to reduce data transmission overhead, comprising:
- a processing apparatus coupled to a communication interface; and
- a computer readable apparatus having a storage medium with at least one computer program stored thereon, the at least one computer program configured to, when executed on the processing apparatus, cause the mobile device to:
  - queue data during a first delay period;
  - establish a connection with a base station;
  - transmit at least a portion of the queued data to the base station;
  - responsive to a successful transmission of at least the portion of the queued data, terminate the established connection; and
  - receive a second data that relates to the first delay period during a subsequent connection.

18. The mobile device of claim 17, where the first delay period is based at least in part on one or more parameters associated with a previous transmission history.

19. The mobile device of claim 17, where the first delay period is based at least in part on one or more parameters associated with a battery consumption.

20. The mobile device of claim 17, where the first delay period is based at least in part on one or more parameters associated with an active software application.

21. Base station apparatus configured to facilitate reduced data transmission overhead, comprising:
- a processing apparatus coupled to a communication interface; and
- a computer readable apparatus having a storage medium with at least one computer program stored thereon, the at least one computer program configured to, when executed on the processing apparatus, cause the base station apparatus to:
  - enable establishment of a connection with a mobile device;
  - after the establishment, receive data transmitted by the mobile device via the established connection, where at least a portion of the received data comprises one or more data that has been queued during a delay period invoked by the mobile device;
  - terminate the established connection after the reception of the data is complete; and
  - transmit second data that relates to the delay period to the mobile device during a subsequent connection therebetween.

22. The base station apparatus of claim 21, wherein:
- the base station apparatus is further configured to evaluate at least one parameter, and based at least in part on the evaluation, generate information configured to indicate whether the delay period should be reduced or should not be reduced; and
- the transmission of the second data that relates to the delay period comprises transmission of the information.

23. The base station apparatus of claim 21, wherein the transmitted second data that relates to the delay period comprises transmitted data useful to the mobile device in a determination of whether the delay period should be adjusted.

24. The base station apparatus of claim 21, where the at least one computer program includes instructions configured to perform legacy data transmissions for one or more legacy devices, the instructions configured to when executed, cause the base station apparatus to:
- determine whether the mobile device is a legacy device; and
- when the mobile device is a legacy device, transition to an idle state after the transmission of data is complete.

\* \* \* \* \*